(12) United States Patent
Shimada et al.

(10) Patent No.: US 10,906,084 B2
(45) Date of Patent: Feb. 2, 2021

(54) WORKPIECE CONVEYANCE DEVICE

(71) Applicant: KOMATSU INDUSTRIES CORPORATION, Kanazawa (JP)

(72) Inventors: Hiromoto Shimada, Nomi (JP); Hidetoshi Akashi, Kanazawa (JP)

(73) Assignee: KOMATSU INDUSTRIES CORPORATION, Ishikawa (JP)

( * ) Notice: Subject to any disclaimer, the term of this patent is extended or adjusted under 35 U.S.C. 154(b) by 125 days.

(21) Appl. No.: 16/320,313

(22) PCT Filed: Nov. 1, 2017

(86) PCT No.: PCT/JP2017/039554
§ 371 (c)(1),
(2) Date: Jan. 24, 2019

(87) PCT Pub. No.: WO2018/088302
PCT Pub. Date: May 17, 2018

(65) Prior Publication Data
US 2019/0151928 A1    May 23, 2019

(30) Foreign Application Priority Data
Nov. 8, 2016   (JP) ................................ 2016-218274

(51) Int. Cl.
*B21D 43/05*    (2006.01)
*B21D 43/10*    (2006.01)
(Continued)

(52) U.S. Cl.
CPC ........... *B21D 43/052* (2013.01); *B21D 43/05* (2013.01); *B21D 43/105* (2013.01); *B30B 13/00* (2013.01);
(Continued)

(58) Field of Classification Search
CPC .... B65G 47/90; B65G 47/902; B65G 47/907; B65G 47/918; B30B 13/00; B21D 43/052; B21D 43/05; B21D 43/105
(Continued)

(56) References Cited

U.S. PATENT DOCUMENTS 5,632,181 A    5/1997  Vanderzee et al.
6,185,815 B1 *  2/2001  Schindler .......... H01L 21/67144
                                                        29/740
(Continued)

FOREIGN PATENT DOCUMENTS

CN    1175915 A    3/1998
CN    1938207 A    3/2007
(Continued)

OTHER PUBLICATIONS

The Office Action for the corresponding Chinese application No. 201780053442.4, dated Jan. 6, 2020.
(Continued)

*Primary Examiner* — James R Bidwell
(74) *Attorney, Agent, or Firm* — Global IP Counselors, LLP

(57) ABSTRACT

A workpiece conveyance device is used for a pressing device. The workpiece conveyance device includes a support member supporting a holding component usable to detachable hold a workpiece, a lever unit including a first lever portion and a second lever portion, a lever unit support body supporting the lever unit, a first lever support portion provided to the lever unit support body, and a second lever support portion provided to the lever unit support body. The second lever portion is provided between the first lever portion and the support member. The second lever portion is rotatably linked to the first lever portion. The lever unit pivotably supports the support member. The first lever
(Continued)

support portion pivotably supports the first lever portion. The second lever support portion slidably and pivotably supports the second lever portion.

13 Claims, 13 Drawing Sheets

(51) Int. Cl.
  *B30B 13/00*   (2006.01)
  *B65G 47/90*   (2006.01)
  *B25J 9/00*   (2006.01)
  *B21J 13/10*   (2006.01)

(52) U.S. Cl.
  CPC ............... *B65G 47/90* (2013.01); *B21J 13/10* (2013.01); *B25J 9/0009* (2013.01)

(58) Field of Classification Search
  USPC .......................................... 198/468.2, 468.4
  See application file for complete search history.

(56) References Cited

U.S. PATENT DOCUMENTS

| | | | |
|---|---|---|---|
| 6,715,981 B1* | 4/2004 | Harsch | B21D 43/05 414/752.1 |
| 7,159,438 B2 | 1/2007 | Lauke et al. | |
| 7,562,765 B2* | 7/2009 | Dodo | B21D 43/11 198/468.01 |
| 8,640,614 B2* | 2/2014 | Nishida | B21D 24/005 100/207 |
| 10,702,909 B2* | 7/2020 | Akashi | B21D 43/18 |
| 2005/0178641 A1* | 8/2005 | Yoshida | B23Q 1/5468 198/468.4 |
| 2008/0149461 A1 | 6/2008 | Dodo et al. | |
| 2012/0114451 A1* | 5/2012 | Nishida | B21D 24/005 414/225.01 |
| 2013/0309050 A1 | 11/2013 | Takeda | |
| 2016/0059300 A1 | 3/2016 | Takeda | |

FOREIGN PATENT DOCUMENTS

| | | | | |
|---|---|---|---|---|
| CN | 101829737 A | 9/2010 | | |
| DE | 10 2006 003 522 A1 | 8/2007 | | |
| JP | 2013-237081 A | 11/2013 | | |
| JP | 2016-49539 A | 4/2016 | | |
| WO | 2018/199090 | * 11/2018 | ............ B30B 13/00 |

OTHER PUBLICATIONS

The International Search Report for the corresponding international application No. PCT/JP2017/039554, dated Jan. 23, 2018.

* cited by examiner

WORKPIECE CONVEYANCE DEVICE

CROSS-REFERENCE TO RELATED APPLICATIONS

This application is a U.S. National stage application of International Application No. PCT/JP2017/039554, filed on Nov. 1, 2017. This U.S. National stage application claims priority under 35 U.S.C. § 119(a) to Japanese Patent Application No. 2016-218274, filed in Japan on Nov. 8, 2016, the entire contents of which are hereby incorporated herein by reference.

BACKGROUND

Field of the Invention

The present invention relates to a workpiece conveyance device.

Background Information

Conventionally, in a tandem press system in which a plurality of pressing devices are disposed side by side or transfer press, a workpiece conveyance device is provided for conveying a workpiece to a machining position (see U.S. Pat. No. 7,159,438, for example).

With the workpiece conveyance device disclosed in U.S. Pat. No. 7,159,438, the proximal end of a first lever portion is pivotably attached to a carrier that moves up and down, and a second lever portion is pivotably attached to the distal end of the first lever portion. A crossbar is attached to the distal end of the second lever portion, and a holding tool (a suction cup or the like) for holding the workpiece is attached to the crossbar.

SUMMARY

However, with the device of the above-mentioned U.S. Pat. No. 7,159,438, the load of the entire arm is exerted on a pivot shaft at the proximal end of the first lever portion, and the load becomes heavy.

In view of the above problems encountered in the past, it is an object of the present invention to provide a workpiece conveyance device with which the load on a shaft can be reduced.

The workpiece conveyance device pertaining to the first aspect is a workpiece conveyance device used for a pressing device, said workpiece conveyance device comprising a support member, a lever unit, a lever unit support body, a first lever support portion, and a second lever support portion. The support member supports a holding component for detachably holding a workpiece. The lever unit has a first lever portion and a second lever portion which is provided between the first lever portion and the support member and is rotatably linked to the first lever portion, and pivotably supports the support member. The lever unit support body supports the lever unit. The first lever support portion is provided to the lever unit support body and pivotably supports the first lever portion. The second lever support portion is provided to the lever unit support body and slidably and pivotably supports the second lever portion.

Consequently, the first lever portion and the second lever portion are supported by the lever unit support at two positions of the first lever support portion and the second lever support portion.

Therefore, the loads of the first lever portion and the second lever portion are dispersed to the first lever support portion and the second lever support portion, and the load exerted on a first shaft, which is the pivot center of the first lever portion, can be reduced.

The workpiece conveyance device according to the second aspect is the workpiece conveyance device according to the first aspect, wherein a first shaft that is the pivot center of the first lever portion in the first lever support portion is parallel with a second shaft that is the pivot center of the second lever portion in the second lever support portion.

Consequently, the pivoting direction of the first lever portion and the pivoting direction of the second lever portion are parallel to each other in plan view, and the workpiece can be conveyed by the cooperation of the first lever portion and the second lever portion.

The workpiece conveyance device according to the third aspect is the workpiece conveyance device according to the second aspect, wherein the first shaft and the second shaft are disposed perpendicular to the workpiece conveyance direction.

Consequently, in plan view, the pivoting direction of the first lever portion and the pivoting direction of the second lever portion run along the workpiece conveyance direction, and the workpiece can be efficiently conveyed by the pivoting of the first lever portion and the second lever portion.

The workpiece conveyance device according to the fourth aspect is the workpiece conveyance device according to the first aspect, further comprising a slide mechanism. The slide mechanism slides the lever unit support in the up and down direction.

Since the second lever portion is slidably and pivotably supported by the lever unit support member, the stroke of the lever unit support body in the up and down direction can be reduced.

For example, with a configuration in which the second lever portion is linked to the distal end of the first lever portion, and the second lever portion is not supported by a carrier that moves up and down, as in a conventional workpiece conveyance device, the up and down stroke of the carrier must be increased in order to pull in the first lever portion and the second lever portion. However, in the present aspect, the second lever portion slides, so the amount by which the first lever portion and the second lever portion are pulled in is reduced, and the up and down stroke of the lever unit support body can be reduced.

The workpiece conveyance device according to the fifth aspect is the workpiece conveyance device according to the first aspect, wherein the first lever support portion has a first driver that pivots the first lever portion.

This allows the first lever portion to be pivoted. Also, providing the first driver to the lever support portion affords a more compact construction.

The workpiece conveyance device according to the sixth aspect is the workpiece conveyance device according to any of the first to fourth aspects, wherein the first lever support portion is disposed above the second lever support portion.

Consequently, the first lever portion and the second lever portion can be pivoted, and the support member that supports the holding component holding the workpiece can be pivoted, while reducing the load exerted on the first shaft.

The workpiece conveyance device according to the seventh aspect is the workpiece conveyance device according to any of the first to fourth aspects, wherein the first lever portion pivots in the opposite direction from the support member in the workpiece conveyance direction when the workpiece is conveyed.

Consequently, the second lever portion can be pivoted in the same direction as the support member, and the second lever portion can be slid in the up and down direction.

The workpiece conveyance device according to the eighth aspect is the workpiece conveyance device according to any of the first to fourth aspects, wherein the first lever support portion is disposed below the second lever support portion.

Consequently, the first lever portion and the second lever portion can be pivoted, and the support member that supports the holding component holding the workpiece can be pivoted, while reducing the load exerted on the first shaft.

The workpiece conveyance device according to the ninth aspect is the workpiece conveyance device according to the sixth or eighth aspect, wherein the first lever portion passes over the upper side in the vertical direction of the first shaft, which is the pivot center of the first lever portion in the first lever support portion, when the workpiece is conveyed.

Consequently, the second lever portion can be pivoted in the same direction as the support member, and the second lever portion can be slid in the up and down direction.

The workpiece conveyance device according to the tenth aspect is the workpiece conveyance device according to the second aspect, wherein the lever unit further has a third lever portion that is provided between the second lever portion and the support member. The third lever portion is linked pivotably around a third shaft to the distal end of the second lever portion. The third shaft is parallel to the first shaft. The workpiece conveyance device further comprises a second driver that pivots the third lever portion.

Consequently, the support member supporting the holding component holding the workpiece can be pivoted in various directions and movements.

The workpiece conveyance device according to the eleventh aspect is the workpiece conveyance device according to the tenth aspect, wherein the lever unit further has a fourth lever portion that is provided between the third lever portion and the support member. The fourth lever portion is linked rotatably around a fourth shaft to the distal end of the third lever portion. The fourth shaft runs along the disposition direction of the third lever portion and the fourth lever portion. The workpiece conveyance device further comprises a third driver that rotates the fourth lever portion.

Consequently, the support member supporting the holding component holding the workpiece can be pivoted in various directions and movements.

The workpiece conveyance device according to the twelfth aspect is the workpiece conveyance device according to the eleventh aspect, wherein the lever unit further has a fifth lever portion that is provided between the fourth lever portion and the support member. The fifth lever portion is linked pivotably around a fifth shaft to the distal end of the fourth lever portion. The fifth shaft is perpendicular to the fourth shaft. The workpiece conveyance device further comprises a fourth driver that pivots the fifth lever portion.

Consequently, the support member supporting the holding component holding the workpiece can be pivoted in various directions and movements.

The workpiece conveyance device according to the thirteenth aspect is the workpiece conveyance device according to the first aspect, further comprising a movement mechanism that moves the holding component in the lengthwise direction of the support member.

Consequently, the position in the width direction of the workpiece can be varied when putting the workpiece in the next machining position, and various kinds of conveyance of the workpiece can be accommodated.

The present invention provides a workpiece conveyance device with which the load exerted on a shaft can be reduced.

DETAILED DESCRIPTION OF EMBODIMENT(S)

The workpiece conveyance device in an embodiment of the present invention will now be described through reference to the drawings.

1. Configuration 1-1. Press System 100

Figure 1:
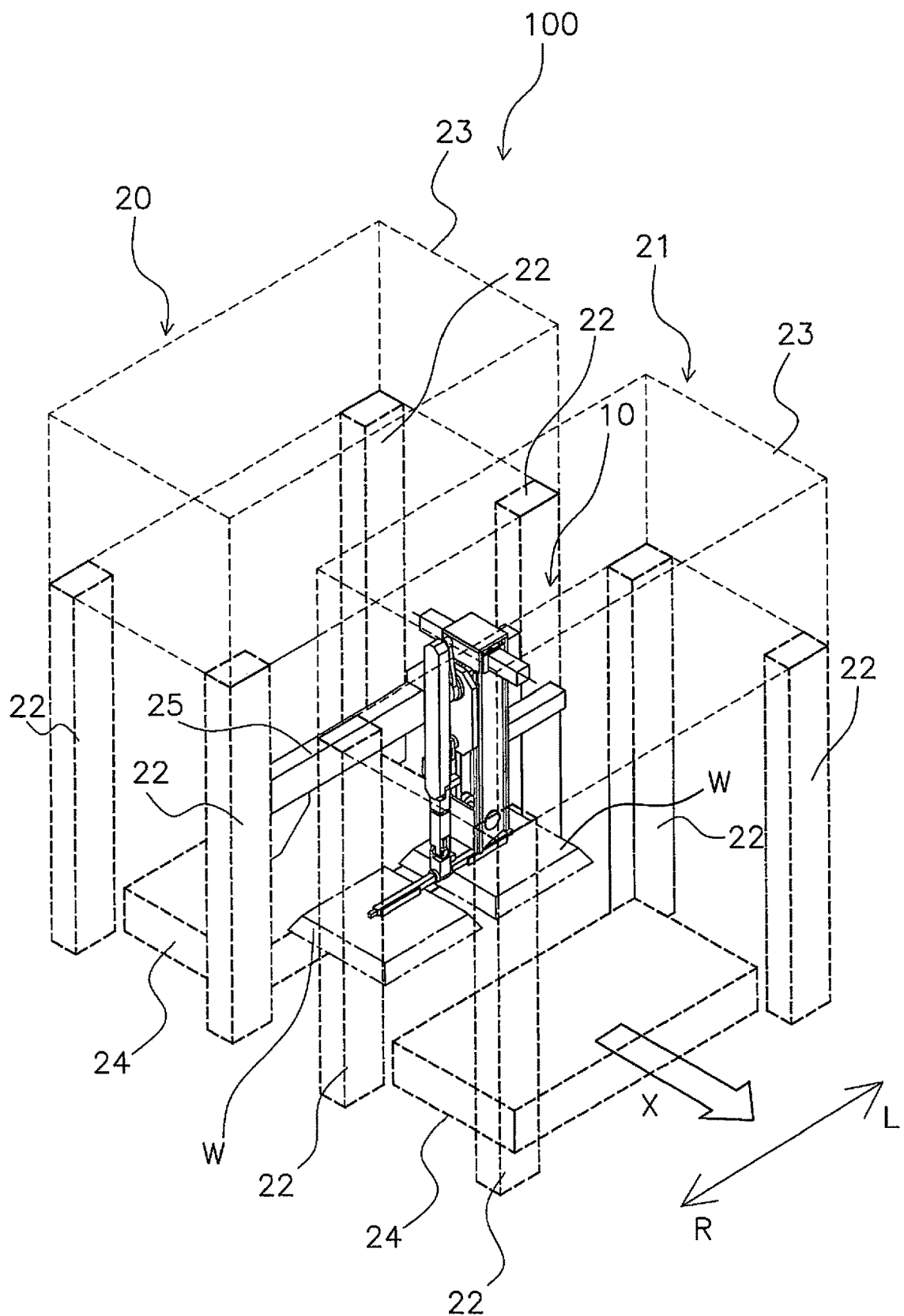
FIG. 1 is a diagram of a press system using a workpiece conveyance device in an embodiment according to the present invention.

FIG. 1 is a simplified diagram showing the configuration of a press system 100 in which the workpiece conveyance device 10 in an embodiment is used.

The press system 100 comprises a first pressing device 20, a second pressing device 21, and a workpiece conveyance device 10 provided between the first pressing device 20 and the second pressing device 21. The first pressing device 20 and the second pressing device 21 are disposed along the workpiece conveyance direction X.

Each of the pressing devices 20 and 21 mainly has uprights 22, a crown 23, and a bolster 24.

The uprights 22 are columnar members, four of which are disposed on a bed (not shown). The four uprights 22 are disposed so as to form rectangular apexes in plan view.

The crown 23 is supported upward by the four uprights 22. In FIG. 1, the crown 23, the uprights 22, and the bolster 24 are indicated by dotted lines in order to make the workpiece conveyance device 10 easier to see. A slide (not shown) is suspended from the crown 23. The crown 23 is provided with a slide driver for moving the slide up and down. An upper mold is detachably attached to the lower side of the slide.

The bolster 24 is disposed between the uprights 22 and below the slide. A lower mold is disposed on the upper side of the bolster 24.

In the above configuration, stamping is performed between the upper die and the lower die when the slide moves toward the bolster 24.

The workpiece conveyance device 10 is provided between a first pressing device 20 and a second pressing device 21. The workpiece conveyance device 10 takes out a workpiece from the first pressing device 20 on the upstream side in the conveyance direction X, and conveys the workpiece W to the second pressing device 21 on the downstream side.

1-2. Workpiece Conveyance Device 10

As shown in FIG. 1, an attachment frame 25 is provided between two uprights 22 on the downstream side in the pressing device 20 on the upstream side. The attachment frame 25 is fixed to the two uprights 22 and supports the workpiece conveyance device 10.

Figure 2:
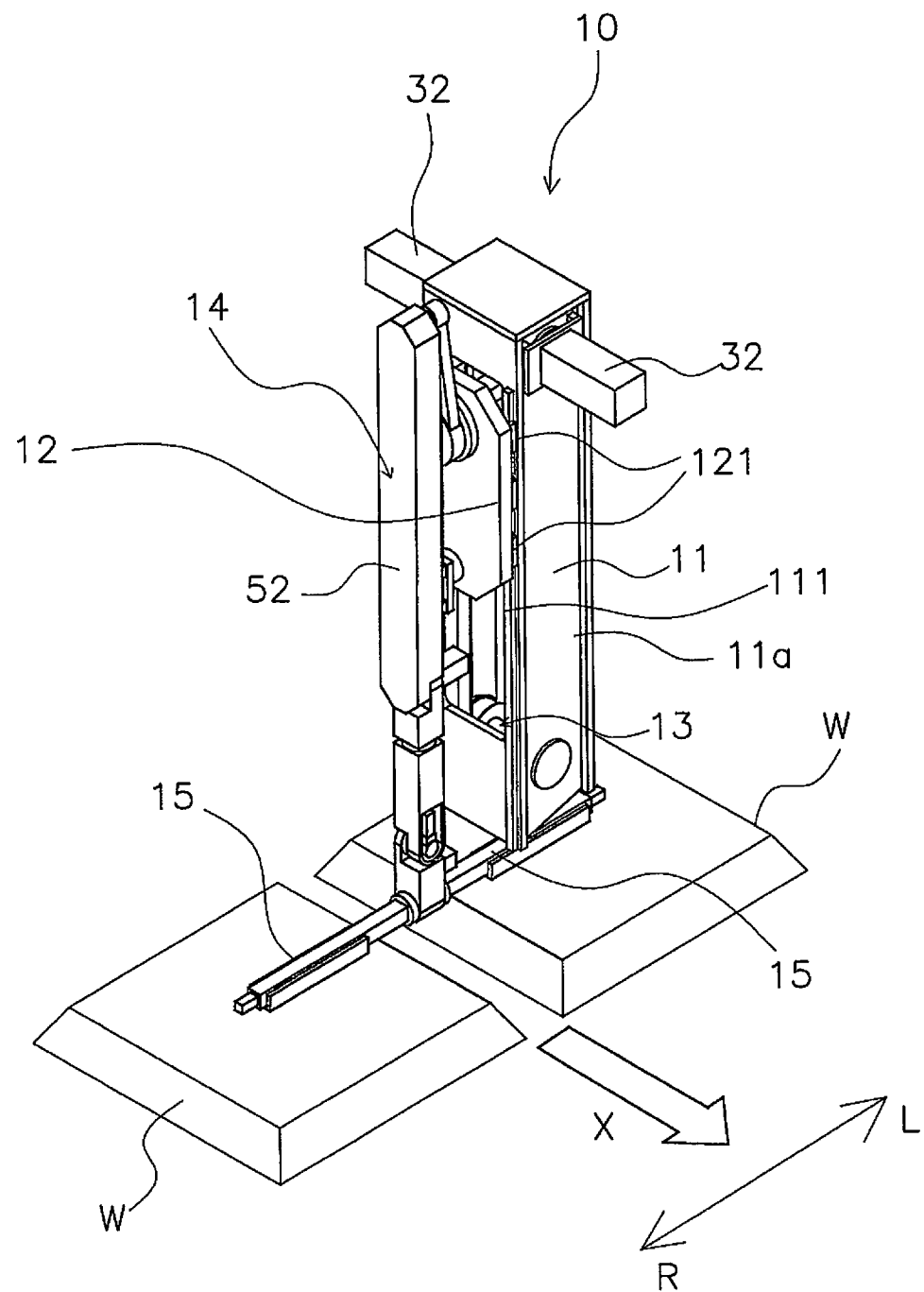
FIG. 2 is an oblique view of the workpiece conveyance device in FIG. 1 as viewed from the right side.
Figure 3:
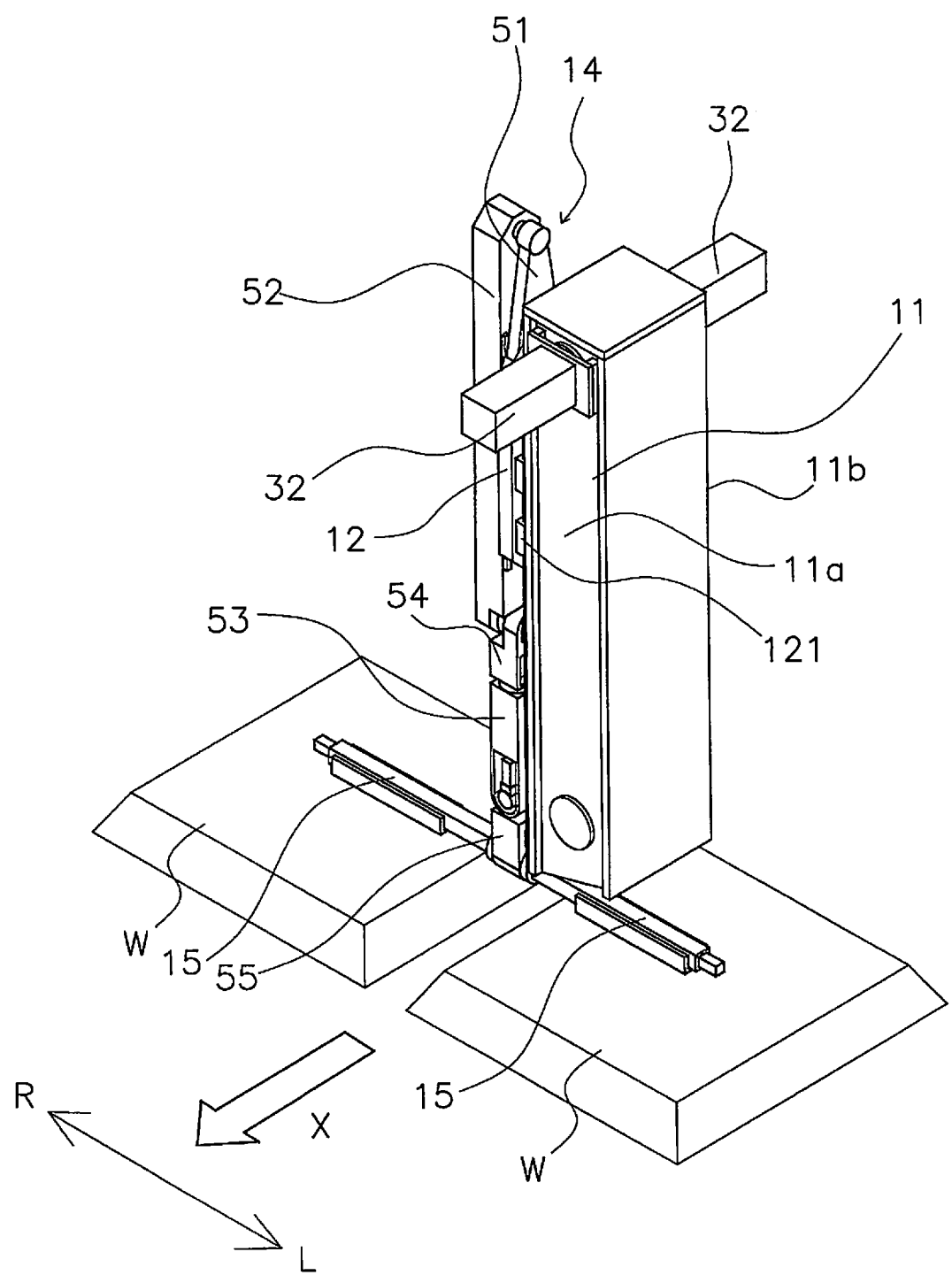
FIG. 3 is an oblique view of the workpiece conveyance device in FIG. 2 as viewed from the left side.
Figure 4:
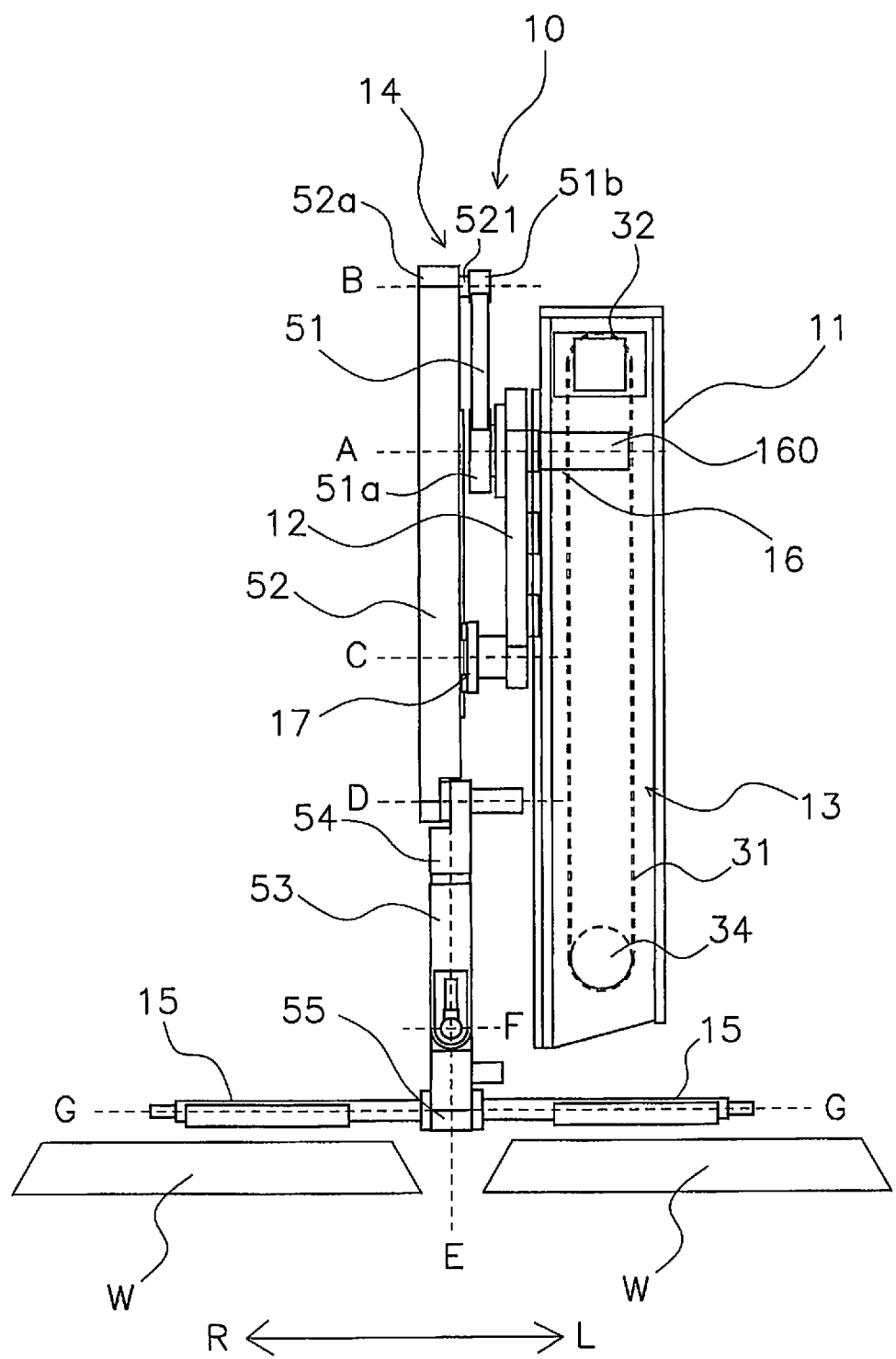
FIG. 4 is a front view of the workpiece conveyance device in FIG. 2 as viewed from the downstream side in the conveyance direction.
Figure 5:
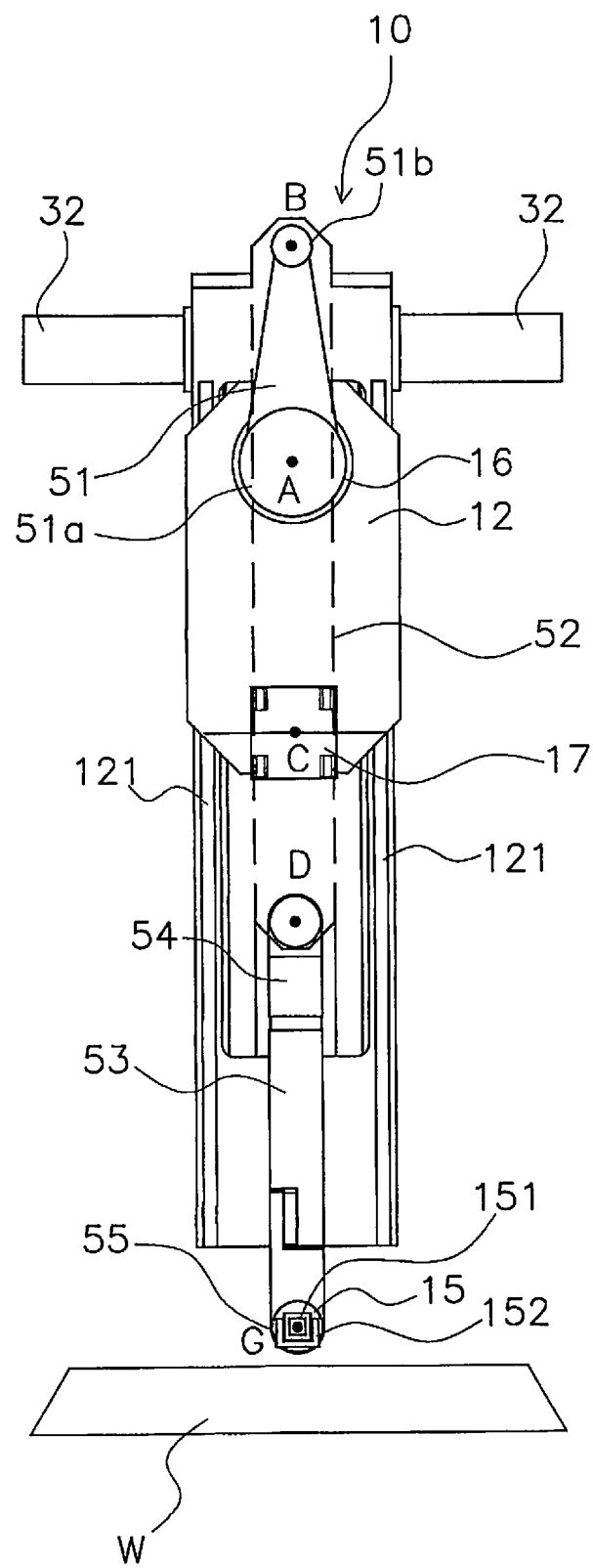
FIG. 5 is a right side view of the workpiece conveyance device in FIG. 2.

FIG. 2 is an oblique view of the workpiece conveyance device 10 as viewed from the right side. FIG. 3 is an oblique view of the workpiece conveyance device 10 as viewed from the left side. FIG. 4 is a front view of the workpiece conveyance device 10 as viewed from the downstream side in the conveyance direction X. FIG. 5 is a right side view of the workpiece conveyance device 10. Here, "the right side" means the right side facing the conveyance direction X, and is indicated by the arrow R. Also, the left side facing the conveyance direction X is indicated by the arrow L. In FIG. 5, a slider arm 52 (discussed below) is indicated by a dotted line.

Figure 6:
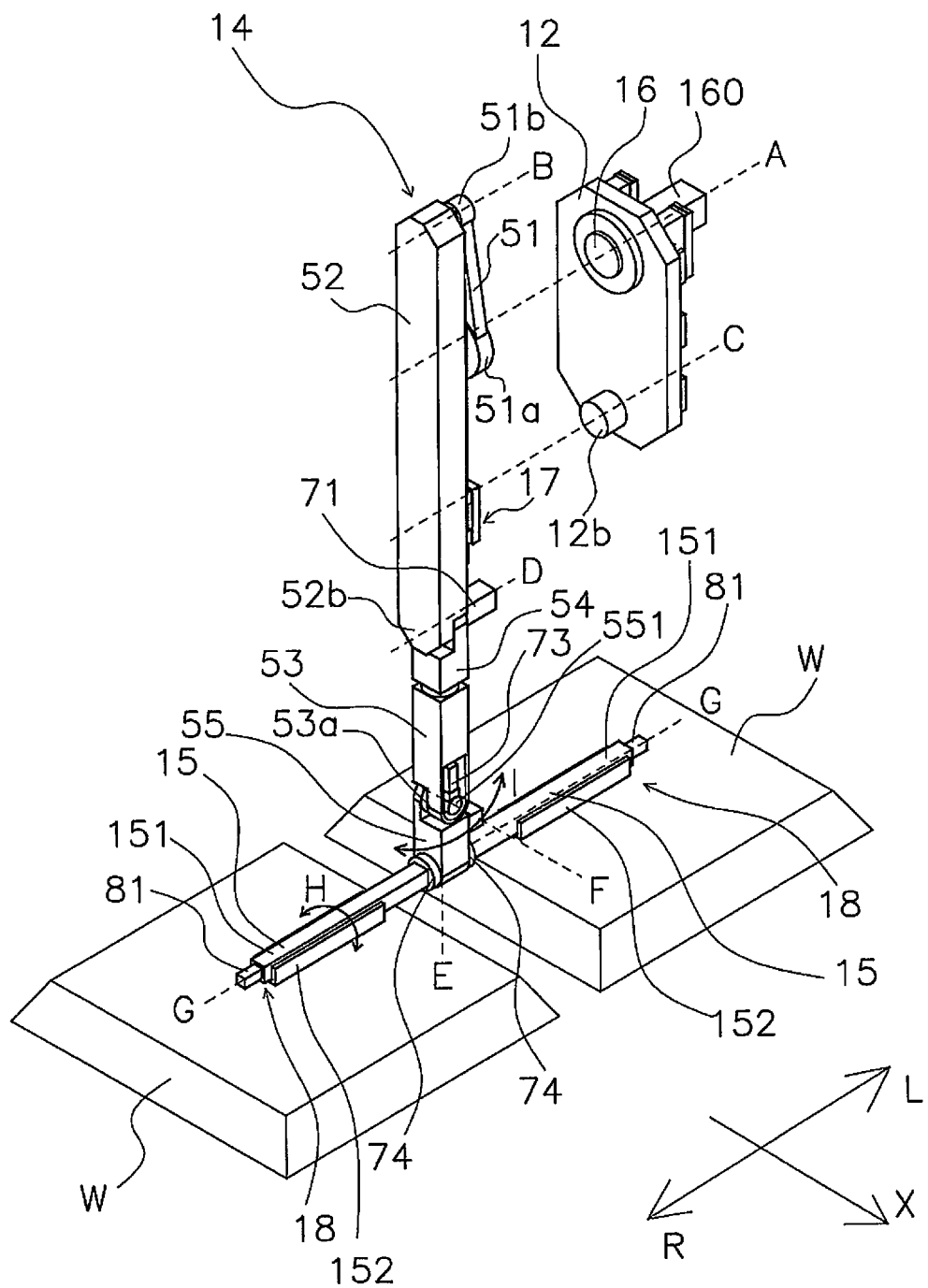
FIG. 6 is an exploded oblique view of the state when the lift carrier has been removed from the lever unit in the workpiece conveyance device of FIG. 2, as viewed from the right side.
Figure 7:
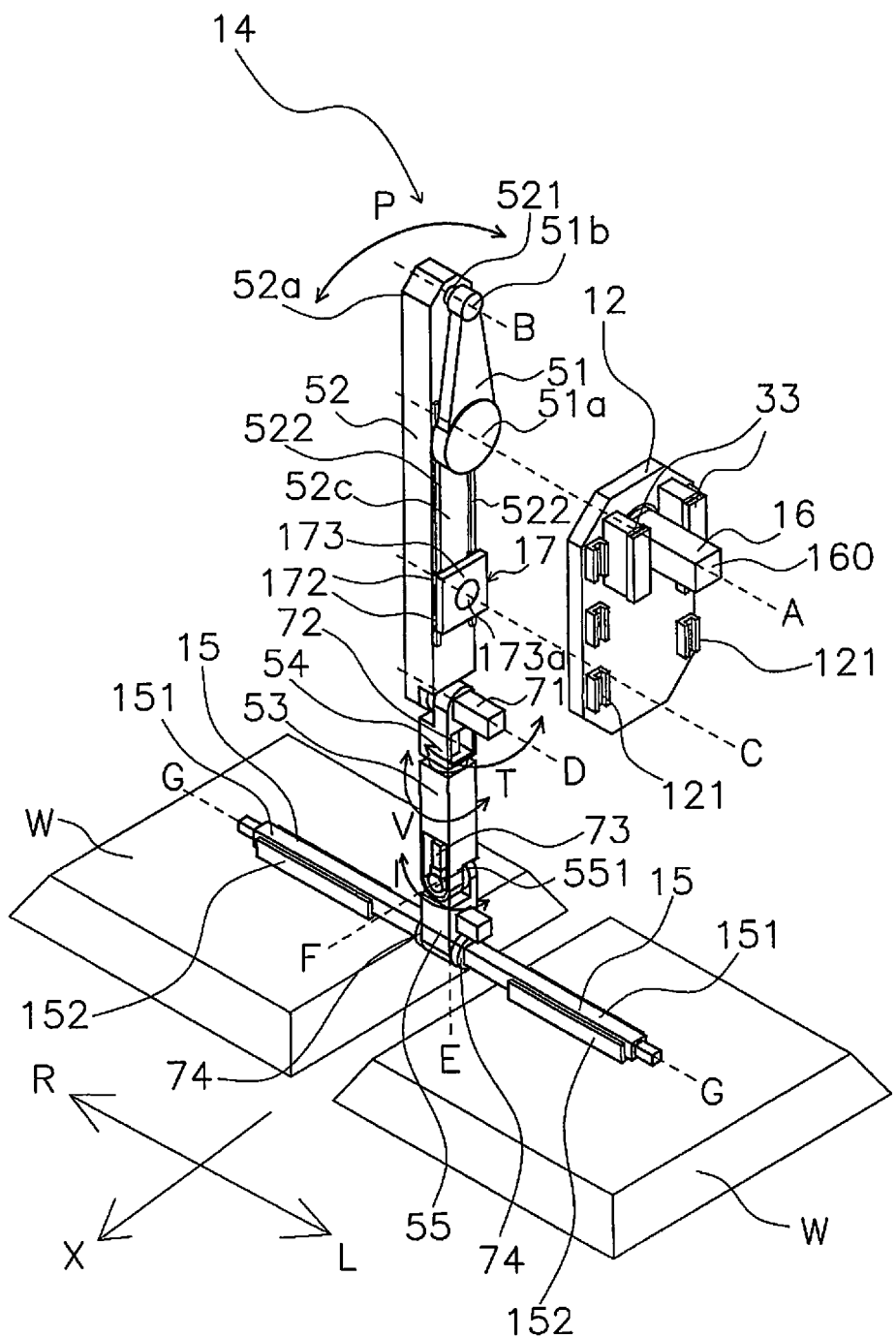
FIG. 7 is an exploded oblique view of the state when the lift carrier has been removed from the lever unit in the workpiece conveyance device of FIG. 2, as viewed from the left side.

As shown in FIG. 2, the workpiece conveyance device 10 mainly has a carrier support frame 11, a lift carrier 12, a carrier drive mechanism 13, a lever unit 14, a crossbar 15, a first lever support portion 16 (see FIG. 4), a second lever support portion 17 (see FIG. 4), a movement mechanism 18 (see FIG. 6), and drivers 71, 72, 73, and 74 (see FIG. 7).

Carrier Support Frame 11

As shown in FIGS. 1 and 2, the carrier support frame 11 is fixed to the attachment frame 25 at its upper part. The carrier support frame 11 has a substantially cuboid shape, and is formed longer in the vertical direction. The carrier support frame 11 supports the carrier drive mechanism 13, and also supports the lift carrier 12 so that it can move up and down.

Carrier Drive Mechanism 13

As shown in FIG. 4, the carrier drive mechanism 13 mainly has belts 31, belt drive motors 32, and belt drive pulleys 34.

The belt drive motors 32 are servomotors, and two of them are provided to the upper part of the carrier support frame 11. As shown in FIG. 2, the belt drive motors 32 are disposed on both the upstream side and the downstream side (in the conveyance direction X) of the carrier support frame 11. The belt drive motors 32 are disposed such that their rotational axis runs along the conveyance direction X.

As shown in FIG. 4, two belt drive pulleys 34 are provided inside the lower part of the carrier support frame 11. The belt drive pulleys 34 are rotatably disposed on support shafts provided across the downstream side face 11a and the upstream side face 11b (see FIG. 3).

Two belts 31 are disposed side by side in the conveyance direction X. As shown in FIG. 4, each of the belts 31 is wrapped around the rotation shaft of the belt drive motor 32 provided at the upper part of the carrier support frame 11 and the belt drive pulley 34 provided at the lower part.

The lift carrier 12 is linked to the two belts 31 by linking components 33 (see FIG. 7; discussed below).

That is, rotational drive of the two belt drive motors 32 causes the belts 31 to rotate, and the lift carrier 12 linked at the linking components 33 moves up and down.

A balancer cylinder or the like may be provided for moving the carrier support frame 11 up and down.

Lift Carrier 12

As shown in FIGS. 2 and 4, the lift carrier 12 is disposed on the side of the right side face of the carrier support frame 11 facing the conveyance direction X, and supports the lever unit 14 (discussed below). FIG. 6 is an exploded oblique view of the state when the lift carrier 12 has been removed from the lever unit 14, as viewed from the right side. FIG. 7 is an exploded oblique view of the state when the lift carrier 12 has been removed from the lever unit 14, as viewed from the left side.

Also, as shown in FIG. 2, a plurality of slide guides 121 (see also FIG. 8; discussed below) are provided to the face of the lift carrier 12 on the carrier support frame 11 side, and mate with slide rails 111 provided along the vertical direction on the carrier support frame 11.

Figure 8:
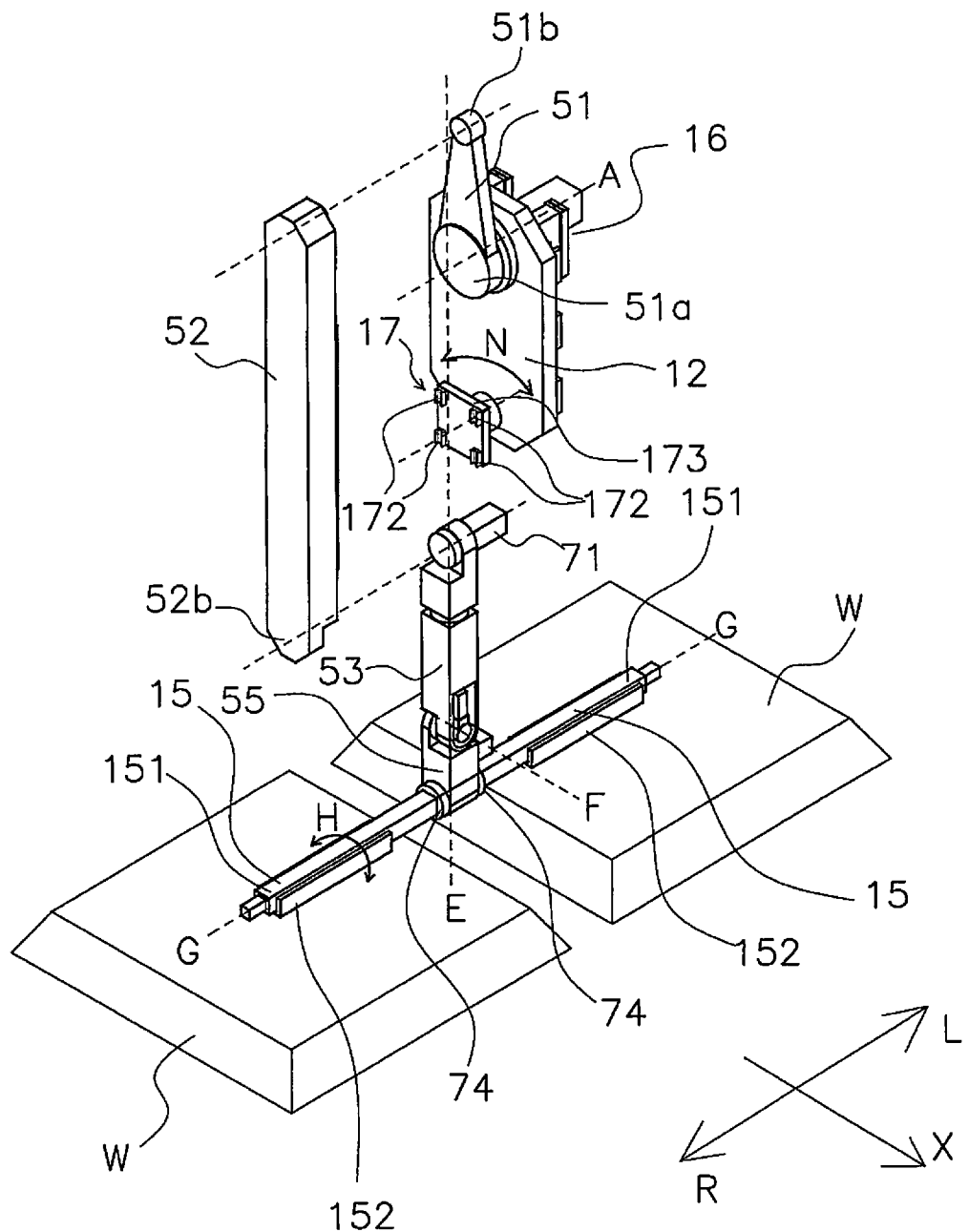
FIG. 8 is an exploded oblique view of the state when the slider arm has been removed from the first lever and second lever linking portion in the workpiece conveyance device of FIG. 2, as viewed from the left side.

As shown in FIG. 8 (discussed below), a plurality of the linking components 33 are provided on the face of the lift carrier 12 on the carrier support frame 11 side, and the lift carrier 12 is connected to the two belts 31 at the linking components 33 and can be moved up and down by the rotational drive of the belt drive motors 32.

As shown in FIG. 6, a first lever support portion 16 is attached to the upper part of the lift carrier 12. The lift carrier 12 has at its lower part a fulcrum shaft 12b for attaching a carrier base 173 of the second lever support portion 17.

Lever Unit 14, First Lever Support Portion 16, Second Lever Support Portion 17

As shown in FIGS. 6 and 7, the lever unit 14 mainly has a first lever 51, a slider arm 52, a second lever linking portion 54, a second lever 53, and a crossbar linking portion 55. The first lever 51, the slider arm 52, the second lever linking portion 54, the second lever 53, and the crossbar linking portion 55 are linked in that order starting from the lift carrier 12 side.

FIG. 8 is an exploded oblique view of the state when the slider arm 52 has been removed from the first lever 51 and the second lever linking portion 54, as viewed from the left side.

The first lever 51 is pivotably supported on the lift carrier 12 via the first lever support portion 16 at its proximal end 51a. As shown in FIG. 7, the first lever 51 is rotatably linked to a rotation shaft 521 provided to the slider arm 52 at its distal end portion 51b. The rotation shaft 521 is disposed on the left side (the arrow L side) of the slider arm 52 and is formed toward the left direction L.

The first lever support portion 16 is connected to the left side (arrow L) of the proximal end 51a of the first lever 51. The first lever support portion 16 has a driver 160 that drives the first lever. As shown in FIG. 7, the driver 160 has a servomotor, a reduction gear, and so forth. The rotation shaft of the servomotor is disposed along the left and right direction (arrow LR). The reduction gear decelerates the rotation of the servomotor and transmits it to the first lever 51. As shown in FIG. 7, the driver 160 is fixed to the lift carrier 12. The rotation of the servomotor causes the first lever 51 to pivot around the rotational axis of the servomotor (axis A) (see the arrow P in FIG. 7).

The slider arm 52 is rotatably linked to the distal end portion 51b of the first lever 51. As shown in FIG. 7, a rotation shaft 521 is formed at the upper end 52a of the slider arm 52. The rotation shaft 521 is inserted into a hole formed in the distal end portion 51b of the first lever 51. As a result, the first lever 51 and the slider arm 52 are linked mutually rotatably around the axis B.

As shown in FIGS. 7 and 8, the second lever support portion 17 is provided on the side of the left side face (the direction of the arrow L) of the slider arm 52. The second lever support portion 17 mainly has guides 172 (such as a linear guide) and a carrier base 173.

Four guides 172 are provided (see FIG. 8), and two guides 172 are mated to each of two rails 522 (see FIG. 7) disposed on the left side face 52c of the slider arm 52 along the lengthwise direction. The guides 172 slide along the rails 522.

The carrier base 173 is fixed to the plurality of guides 172, and slides relative to the slider arm 52 as the guides 172 move.

The slider arm 52 may be provided with a balancer cylinder or the like.

A hole 173a is formed in the carrier base 173, and a cross roller bearing is disposed around the hole 173a. As shown in FIGS. 6 to 8, the fulcrum shaft 12b of the lift carrier 12 is fitted into the hole 173a. Thus, the carrier base 173 is configured to be rotatable around the axis C with respect to the lift carrier 12 by means of the cross roller bearing (see the arrow N in FIG. 8).

That is, the carrier base 173 is configured to be rotatable with respect to the lift carrier 12 and to be slidable with respect to the slider arm 52.

The second lever 53 is linked to the lower end 52b of the slider arm 52 via the second lever linking portion 54.

As shown in FIGS. 7 and 8, the lower end 52b of the slider arm 52 and the upper end of the second lever linking portion 54 are provided with a driver 71 for pivoting the second lever linking portion 54. The driver 71 has a rotation motor (servomotor) and a reduction gear that decelerates the rotation of the rotation motor (servomotor), and transmits this rotation to the second lever linking portion 54. The rotational drive of this rotation motor causes the second lever linking portion 54 to pivot with respect to the slider arm 52 around the axis D extending in the left and right direction (LR direction) (see the arrow T in FIG. 7).

Further, as shown in FIG. 7, the second lever linking portion 54 is provided with a driver 72 that rotates the second lever 53. The driver 72 has a rotation motor (servo motor) and a reduction gear that decelerates the rotation of the rotation motor (servomotor), and transmits this rotation to the second lever 53. The rotational drive of the rotary motor causes the second lever 53 to rotate around the axis E (see the arrow V in FIG. 7). The axis E is provided along the disposition direction of the second lever linking portion 54 and the second lever 53. It could also be said that the axis E is provided along the lengthwise direction of the second lever 53. It could also be said that the axis E is provided along the lengthwise direction of the second lever linking portion 54.

As shown in FIG. 6, the crossbar linking portion 55 links the crossbar 15 to the second lever 53. A linking shaft 551 is provided to the crossbar linking portion 55 along the conveyance direction X, and the linking shaft 551 is rotatably supported by the distal end 53a of the second lever 53.

A driver 73 for driving the linking shaft 551 with respect to the second lever 53 is fixed to the distal end 53a of the second lever 53. The driver 73 has a rotation motor (servomotor) and a reduction gear. The reduction gear decelerates the rotational drive of the rotation motor and transmits it to the linking shaft 551, and the linking shaft 551 rotates. Thus, the rotation of the rotation motor causes the crossbar linking portion 55 to pivot around the axis F along the linking shaft 551 (see the arrow I). Here, the axis F is provided perpendicular to the axis E.

Crossbar 15, Movement Mechanism 18

As shown in FIG. 6, the crossbar 15 consists of a pair of left and right bars, which are linked to the crossbar linking portion 55 via a driver 74. The driver 74 shown in FIG. 6 is disposed between the crossbar linking portion 55 and the crossbars 15, and has a servo motor and a reduction gear. The reduction gear is attached to the crossbar linking portion 55. Also, the servomotor is disposed such that its axis (see the axis G) runs along the lengthwise direction of the crossbars 15. The rotational drive of the servomotor causes the crossbars 15 to rotate around the axis G (see the arrow H).

Each crossbar 15 has a crossbar body 151 and a crossbar carrier 152. The crossbar body 151 is in the form of a slender quadrangular prism and is fixed to the reduction gear of the driver 74.

A suction cup or the like is attached to the crossbar carrier 152 to detachably hold the workpiece W. The crossbar carrier 152 is provided on the lower side of the crossbar body 151. Also, the movement mechanism 18 is provided for moving the crossbar carrier 152 in the lengthwise direction of the crossbar body 151.

The movement mechanism 18 has a carrier shift servomotor 81 and a ball screw or the like (not shown). The carrier shift servomotor 81 is disposed outside the crossbar body 151. The carrier shift servomotor 81 is disposed so that its rotational axis runs in the left and right direction. The ball screw is disposed in the left and right direction inside the crossbar body 151, and is linked to the carrier shift servo motor 81. The crossbar carrier 152 meshes with the ball screw.

When the carrier shift servomotor 81 is driven, the ball screw rotates and the crossbar carrier 152 moves in the left and right direction. This allows the crossbar carrier 152 to be moved in the left and right direction.

2. Operation

Figure 9:
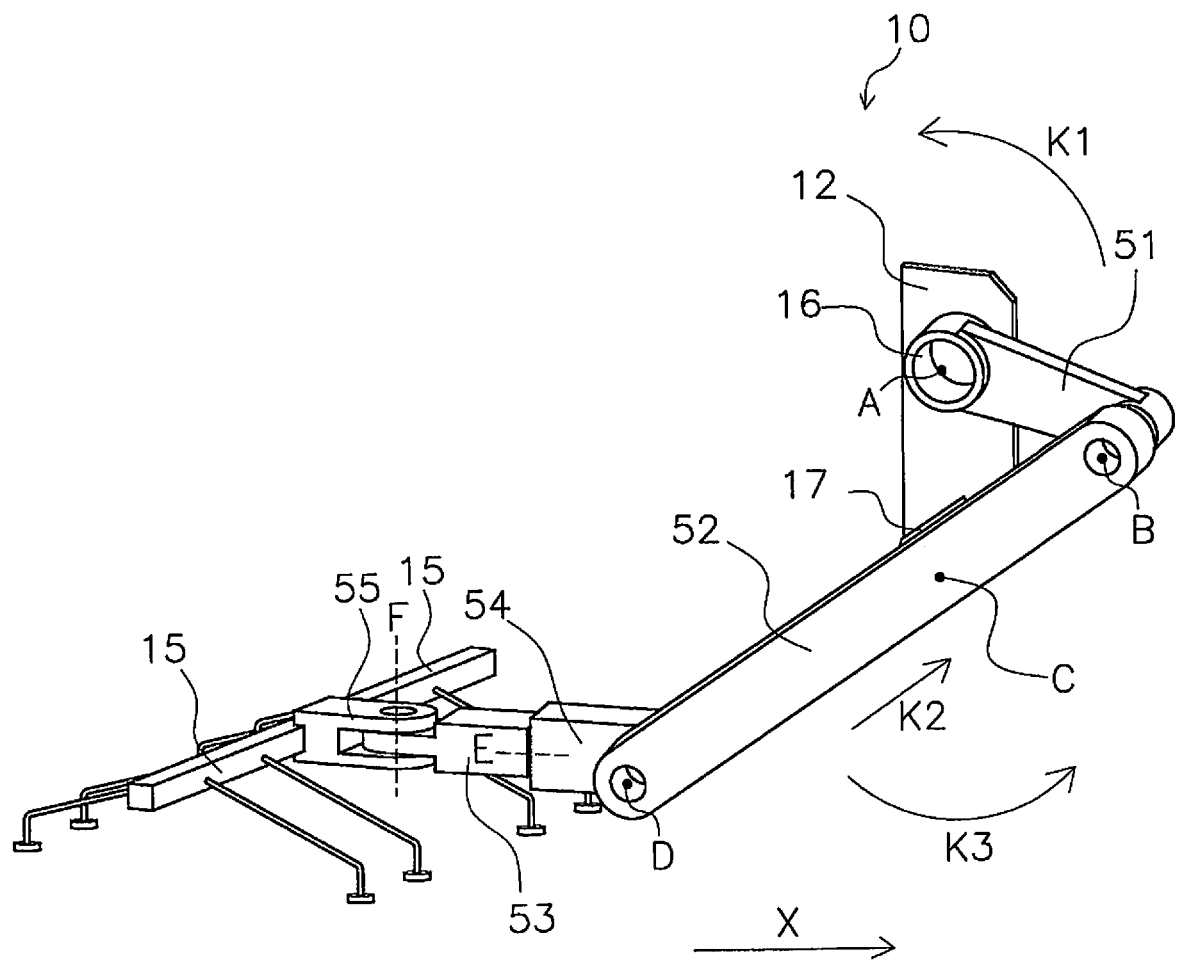
FIG. 9 is a diagram showing the operation of the workpiece conveyance device in an embodiment.
Figure 10:
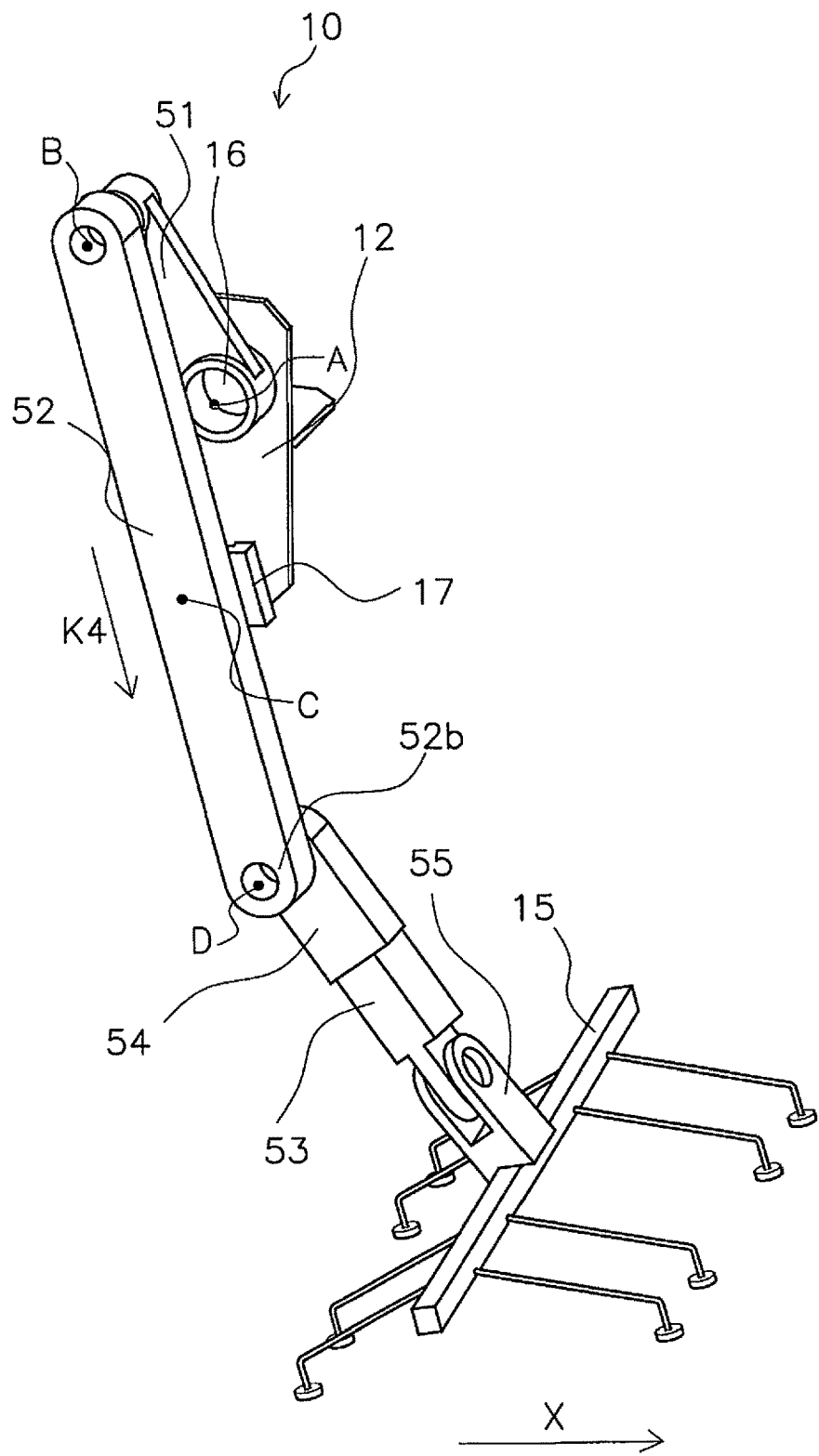
FIG. 10 is a diagram showing the operation of the workpiece conveyance device in an embodiment.
Figure 11:
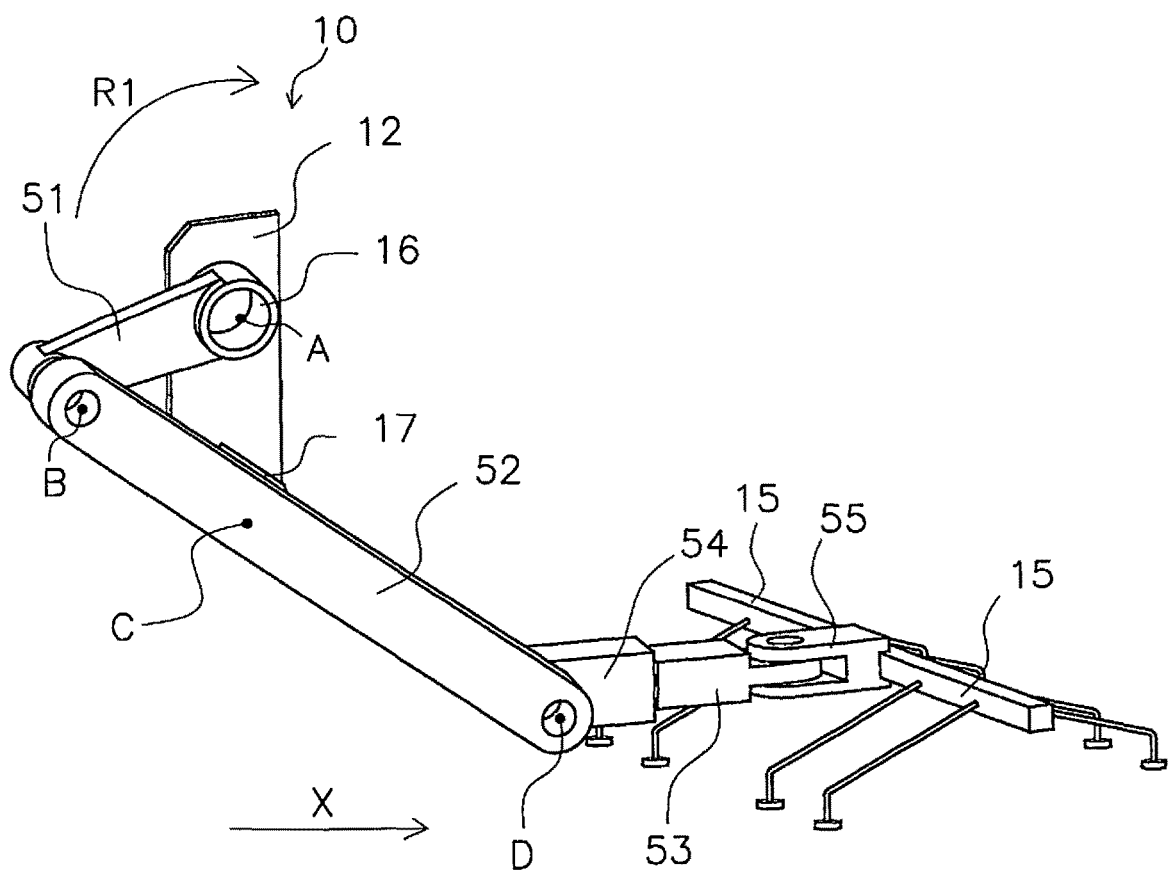
FIG. 11 is a diagram showing the operation of the workpiece conveyance device in an embodiment.

FIGS. 9 to 11 are simplified diagrams illustrating the operation of the workpiece conveyance device 10 in this embodiment. FIG. 9 is a diagram of the state when the workpiece conveyance device 10 is holding the workpiece W (not shown) in the upstream pressing device 20. FIG. 10 is a diagram of the state when the workpiece conveyance device 10 is in the midst of conveying the workpiece W (not shown) to the downstream pressing device 21. FIG. 11 is a diagram of the state when the workpiece conveyance device 10 has the workpiece W (not shown) disposed at the downstream pressing device 20.

As shown in FIG. 9, when the servomotor of the driver 160 of the first lever support portion 16 is driven in a state in which the workpiece W is held, the first lever 51 pivots around the axis A, which is the pivot center of the first lever 51, on the upper side of the axis A and toward the upstream side in the conveyance direction X (see the arrow K1).

As shown in FIG. 10, as the first lever 51 pivots, the slider arm 52 slides upward (see the arrow K2) and pivots around the axis C, which is the center of the hole 173a of the carrier base 173, so that the lower end 52b moves to the downstream side in the conveyance direction X (see the arrow K3).

When the first lever 51 pivots to the upstream side in the conveyance direction X from the axis A, the slider arm 52 slides downward (see the arrow K4) along with the pivoting of the first lever 51, and further pivots around the axis C as shown in FIG. 11. The drivers 71, 72, 73, and 74 and the movement mechanism 18 drive so as to move the workpiece W held by the suction pads provided to the crossbars 15 in the conveyance direction X while the workpiece W is maintained at the set inclination, along with the movement of the first lever 51 and the slider arm 52

As described above, the workpiece W can be moved in the conveyance direction X.

3. Features (3-1)

The workpiece conveyance device 10 in this embodiment is a workpiece conveyance device used for a pressing device, and comprises the crossbar 15 (an example of a support member), the lever unit 14, the lift carrier 12 (an example of a lever unit support body), the first lever support portion 16, and the second lever support portion 17. The crossbar 15 supports the crossbar carrier 152 (an example of a holding component) that detachably holds the workpiece W. The lever unit 14 has the first lever 51 (an example of a first lever portion) and the slider arm 52 (an example of a second lever portion) that is provided between the first lever 51 and the crossbar 15 and is rotatably linked to the first lever 51, and pivotably supports the crossbar 15 (an example of a support member). The lift carrier 12 supports the lever unit 14. The first lever support portion 16 is provided to the lift carrier 12 and pivotably supports the first lever 51. The second lever support portion 17 is provided to the lift carrier 12 and pivotably and slidably supports the slider arm 52.

As a result, the first lever 51 and the slider arm 52 are supported on the lift carrier 12 at two positions: the first lever support portion 16 and the second lever support portion 17.

Therefore, the load produced by the first lever 51 and the slider arm 52 is distributed to the first lever support portion 16 and the second lever support portion 17, and the load on the axis A (an example of a first axis), which is the pivot center of the first lever 51, can be reduced.

(3-2)

With the workpiece conveyance device 10 of this embodiment, the axis A (an example of a first axis), which is the pivot center of the first lever 51 in the first lever support portion 16, and the axis C (an example of a second axis), which is the pivot center of the slider arm 52 in the second lever support portion 17, are parallel.

Consequently, the pivot direction of the first lever 51 and the pivot direction of the slider arm 52 are parallel to each other in plan view, and the workpiece can be conveyed by the cooperation of the first lever 51 and the slider arm 52.

(3-3)

With the workpiece conveyance device 10 in this embodiment, the axis A (an example of a first axis) and the axis C (an example of a second axis) are disposed perpendicular to the workpiece conveyance direction X.

Consequently, in plan view, the pivot direction of the first lever 51 and the pivot direction of the slider arm 52 are along the workpiece conveyance direction X, and the workpiece can be efficiently conveyed by the pivoting of the first lever 51 and the slider arm 52.

(3-4)

The workpiece conveyance device 10 in this embodiment further comprises the carrier drive mechanism 13 (an example of a slide mechanism). The carrier drive mechanism 13 slides the lift carrier 12 (an example of a lever unit support body) in the up and down direction.

Since the slider arm 52 (an example of a second lever portion) is slidably and pivotably supported by the lift carrier 12, the stroke of the lift carrier 12 in the up and down direction can be reduced.

For example, with a configuration such as that of a conventional workpiece conveyance device, in which the second lever portion is linked to the distal end of the first lever portion, and the second lever portion is not supported by the carrier that moves up and down, the vertical stroke of the carrier must be increased in order to pull in the first lever portion and the second lever portion. However, since the slider arm 52 (an example of a second lever portion) slides as in this embodiment, the amount by which the first lever 51 (an example of a first lever portion) and the slider arm 52 (an example of a second lever portion) are pulled in is reduced, and the vertical stroke of the lift carrier 12 (an example of a lever unit support body) can be shortened.

(3-5)

With the workpiece conveyance device 10 in this embodiment, the first lever support portion 16 has a driver 160 (an example of a first driver) that pivots the first lever 51.

This allows the first lever 51 to be pivoted. Also, providing the driver 160 to the first lever support portion 16 makes it possible to achieve a more compact structure.

(3-6)

With the workpiece conveyance device 10 in this embodiment, the first lever support portion 16 is disposed above the second lever support portion 17.

Consequently, the first lever 51 and the slider arm 52 can be pivoted while reducing the load exerted on the axis A (the first axis), and the crossbar 15 (an example of a support member) that supports the crossbar carrier 152 (an example of a holding component) that holds the workpiece W can be pivoted.

(3-7)

With the workpiece conveyance device 10 in this embodiment, the first lever 51 (an example of a first lever portion) pivots in the opposite direction from the crossbar 15 (an example of a support member) in the conveyance direction X when the workpiece W is conveyed.

This allows the slider arm 52 (an example of a second lever portion) to be pivoted in the same direction as the crossbar 15, and allows the slider arm 52 to be slid in the up and down direction.

(3-8)

With the workpiece conveyance device 10 in this embodiment, the first lever 51 (an example of a first lever portion) passes over the upper side in the vertical direction of the axis A (an example of a first axis), which is the pivot center of the first lever 51 in the first lever support portion 16, when the workpiece W is transported.

This allows the slider arm 52 (an example of a second lever portion) to be pivoted in the same direction as the crossbar 15 (an example of a support member), and allows the slider arm 52 to be slid in the up and down direction.

(3-9)

With the workpiece conveyance device 10 in this embodiment, the lever unit 14 further has the second lever linking portion 54 (an example of a third lever portion) provided between the slider arm 52 (second lever portion) and the crossbar 15. The second lever linking portion 54 (an example of a third lever portion) is linked to the distal end of the slider arm 52 (an example of a second lever portion) pivotably around the axis D (an example of a third axis). The axis D (an example of a third axis) is parallel to the axis A (an example of a first axis). The workpiece conveyance device 10 further comprises the driver 71 (an example of a second driver) that pivots the second lever linking portion 54.

Consequently, the crossbar 15 (an example of a support member) that supports the crossbar carrier 152 (an example of a holding component) that holds the workpiece W can be pivoted in various orientations and motions.

(3-10)

With the workpiece conveyance device 10 in this embodiment, the lever unit 14 further has the second lever 53 (an example of a fourth lever portion) provided between the second lever linking portion 54 (an example of a third lever portion) and the crossbar 15 (an example of a support member). The second lever 53 (an example of a fourth lever portion) is linked to the distal end of the second lever linking portion 54 (an example of a third lever portion) so as to be rotatable around the axis E (an example of a fourth axis). The axis E runs along the disposition direction of the second lever linking portion 54 and the second lever 53. The workpiece conveyance device 10 further comprises the driver 72 (an example of a third driver) that rotates the second lever 53.

This allows the crossbar 15 (an example of a support member) that supports the crossbar carrier 152 (an example of a holding component) that holds the workpiece W to be pivoted with various orientations and motions.

(3-11)

With the workpiece conveyance device 10 in this embodiment, the lever unit 14 further has the crossbar linking portion 55 (an example of a fifth lever portion) provided between the second lever 53 (an example of a fourth lever portion) and the crossbar 15 (an example of a support member). The crossbar linking portion 55 (an example of a fifth lever portion) is linked to the distal end of the second lever 53 (an example of a fourth lever portion) so as to be capable of pivoting around the axis F (an example of a fifth axis). The axis F (an example of a fifth axis) is perpendicular to the axis E (an example of a fourth axis). The workpiece conveyance device 10 further comprises the driver 73 (an example of a fourth driver) that pivots the crossbar linking portion 55.

This allows the crossbar 15 (an example of a support member) that supports the crossbar carrier 152 (an example of a holding component) that holds the workpiece W to be pivoted with various orientations and motions.

(3-12)

The workpiece conveyance device 10 of this embodiment further comprises the movement mechanism 18 that moves the crossbar carrier 152 (an example of a holding component) along the lengthwise direction of the crossbar 15 (an example of a support member).

This allows the position of the workpiece W in the width direction to be changed when the workpiece W is disposed at the next processing position, and makes it possible to accommodate various kinds of conveyance of the workpiece W.

4. Other Embodiments

An embodiment of the present invention was described above, but the present invention is not limited to or by the above embodiment, and various modifications are possible without departing from the gist of the invention.

(A)

In the above embodiment, the first lever support portion 16 is disposed vertically above the second lever support portion 17, but the second lever support portion 17 may be disposed vertically above the first lever support portion 16.

Figure 12A:
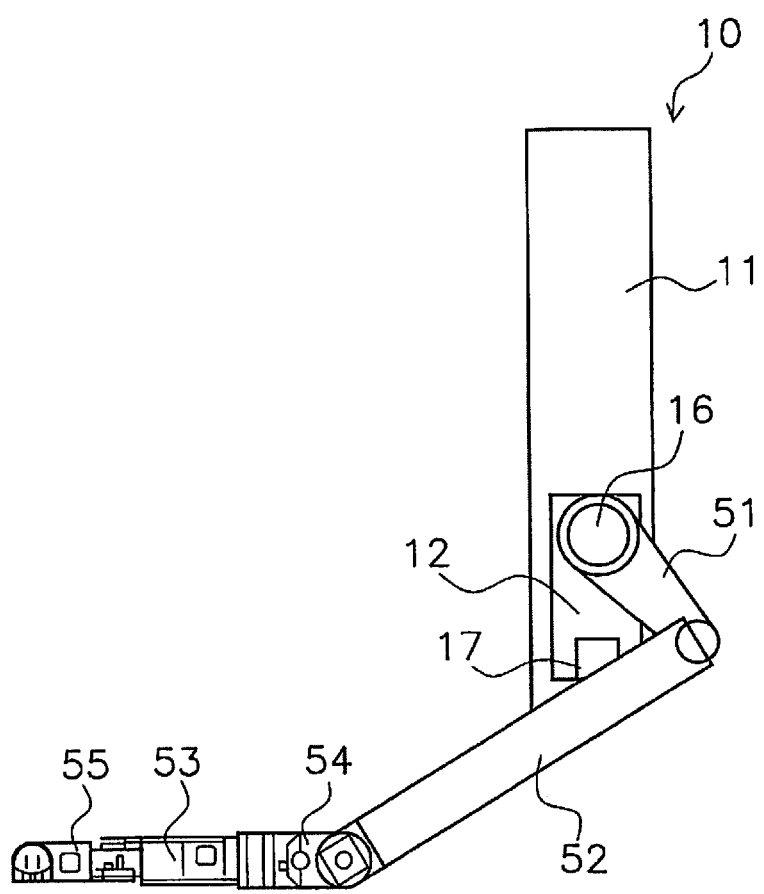
FIGS. 12A and 12B are diagrams showing the configuration of the workpiece conveyance device in an embodiment.
Figure 12B:
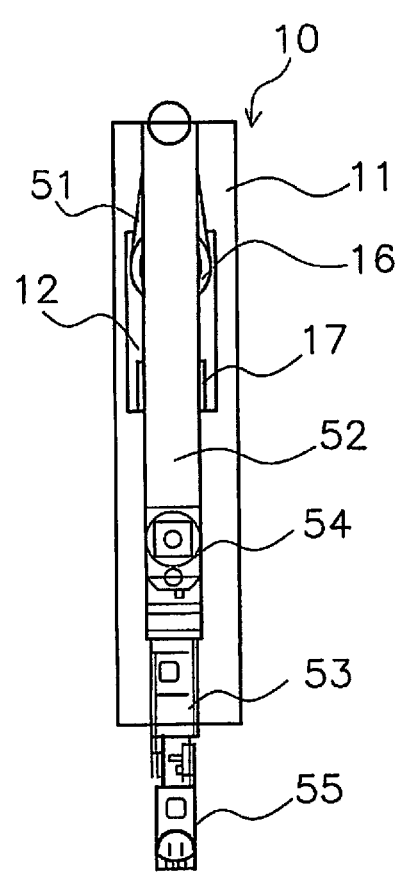
Figure 13A:
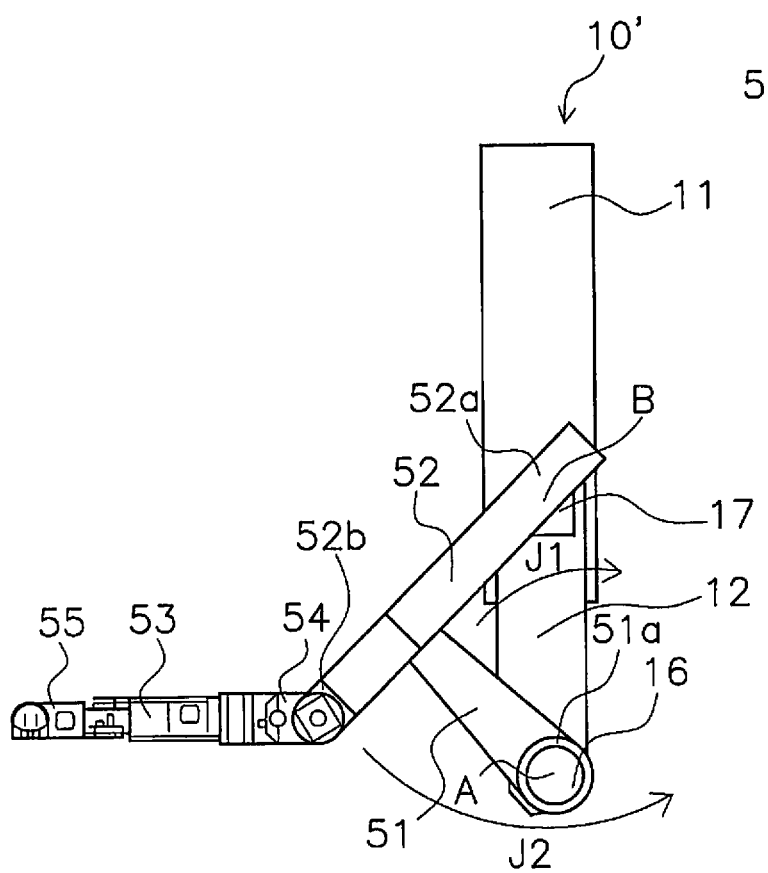
FIGS. 13A and 13B are diagrams showing the configuration of the workpiece conveyance device in an embodiment.
Figure 13B:
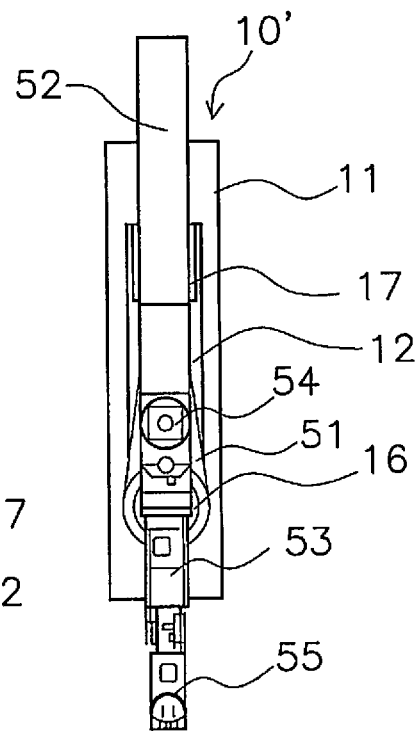

FIGS. 12A and 12B are simplified side views of the configuration of the workpiece conveyance device 10 in the above embodiment, and are shown for comparison with FIGS. 13A and 13B (discussed below). FIGS. 13A-13B is a simplified side view of the configuration of a workpiece conveyance device 10' in which the second lever support portion 17 is disposed vertically above the first lever support portion 16.

Comparing to FIGS. 12A-12B and FIGS. 13A-13B, the workpiece conveyance device 10' shown in FIGS. 13A-13B differs from the workpiece conveyance device 10 in FIGS. 12A-12B in that the upper end 52a of the slider arm 52 is linked at the second lever support portion 17 on the upper part of the lift carrier 12. Also, the proximal end 51a of the first lever 51 is supported at the first lever support portion 16 at the lower part of the lift carrier 12. The first lever 51 is rotatably linked near the center of the slider arm 52.

As shown in FIGS. 13A-13B, the rotation of the servomotor of the driver 160 of the first lever support portion 16 causes the first lever 51 to rotate forward through the upper side of the axis A (the arrow J1). This rotation causes the lower end 52b of the slider arm 52 to pivot forward (the arrow J2) around the axis B while the slider arm 52 slides in the up and down direction.

(B)

In the above embodiment, the second lever linking portion 54, the second lever 53, and the crossbar linking portion 55 are provided, but these components may be increased or decreased as needed. That is, the crossbar linking portion 55 may be provided directly to the lower end 52b of the slider arm 52, or another component may be provided between the second lever linking portion and the second lever 53.

(C)

In the above embodiment, the lift carrier 12 is raised and lowered by belt drive, but it may instead be driven by a ball screw mechanism, a rack and pinion mechanism, or the like.

(D)

In the above embodiment, the workpiece conveyance device 10 conveys the workpiece W between the pressing devices 20 in a tandem press, but this is not the only option, and the workpiece conveyance device 10 may be used for conveying the workpiece W between a plurality of dies in a single pressing device. Also, it may be used for loading the workpiece W from a conveyance device such as a conveyor belt into the pressing device 20, or may be used for conveying the workpiece W from the pressing device 20 to a conveyance device such as a conveyor belt.

The workpiece conveyance device of the present invention has the effect of making it possible to reduce the load on a shaft, and is useful as a press line system or the like.

The invention claimed is:

1. A workpiece conveyance device used for a pressing device, the workpiece conveyance device comprising:
    a support member supporting a holding component usable to detachable hold a workpiece;
    a lever unit including a first lever portion and a second lever portion, the second lever portion being provided between the first lever portion and the support member, the second lever portion being rotatably linked to the first lever portion, and the lever unit pivotably supporting the support member;

a lever unit support body supporting the lever unit;

a first lever support portion provided to the lever unit support body, the first lever support portion pivotably supporting the first lever portion; and a second lever support portion provided to the lever unit support body, the second lever support portion slidably and pivotably supporting the second lever portion.

2. The workpiece conveyance device according to claim 1, wherein
a first shaft is parallel with a second shaft, the first shaft being a pivot center of the first lever portion in the first lever support portion, and the second shaft being a pivot center of the second lever portion in the second lever support portion.

3. The workpiece conveyance device according to claim 2, wherein
the first shaft and the second shaft are disposed perpendicular to a workpiece conveyance direction.

4. The workpiece conveyance device according to claim 1, further comprising:
a slide mechanism configured to slide the lever unit support in an up and down direction.

5. The workpiece conveyance device according to claim 1, wherein
the first lever support portion includes a first driver configured to pivot the first lever portion.

6. The workpiece conveyance device according to claim 1, wherein
the first lever support portion is disposed above the second lever support portion.

7. The workpiece conveyance device according to claim 1, wherein
the first lever portion pivots in an opposite direction from the support member in a workpiece conveyance direction when the workpiece is conveyed.

8. The workpiece conveyance device according to claim 1, wherein
the first lever support portion is disposed below the second lever support portion.

9. The workpiece conveyance device according to claim 6, wherein
the first lever portion passes over an upper side in a vertical direction of a first shaft when the workpiece is conveyed, and the first shaft is a pivot center of the first lever portion in the first lever support portion.

10. The workpiece conveyance device according to claim 2, further comprising:
a second driver,
the lever unit further including a third lever portion provided between the second lever portion and the support member,
the third lever portion being linked pivotably around a third shaft to a distal end of the second lever portion,
the third shaft being parallel to the first shaft, and
the second driver being configured to pivot the third lever portion.

11. The workpiece conveyance device according to claim 10, further comprising:
a third driver,
the lever unit further including a fourth lever portion provided between the third lever portion and the support member,
the fourth lever portion being linked rotatably around a fourth shaft to a distal end of the third lever portion,
the fourth shaft extending along a disposition direction of the third lever portion and the fourth lever portion, and
the third driver being configured to rotate the fourth lever portion.

12. The workpiece conveyance device according to claim 11, further comprising:
a fourth driver,
the lever unit further including a fifth lever portion provided between the fourth lever portion and the support member,
the fifth lever portion being linked pivotably around a fifth shaft to a distal end of the fourth lever portion,
the fifth shaft being perpendicular to the fourth shaft, and
the fourth driver being configured to pivot the fifth lever portion.

13. The workpiece conveyance device according to claim 1, further comprising
a movement mechanism configured to move the holding component in a lengthwise direction of the support member.

* * * * *